United States Patent
Fujimori et al.

[11] Patent Number: 6,108,718
[45] Date of Patent: Aug. 22, 2000

[54] COMMUNICATION METHOD AND ELECTRONIC APPARATUS THEREOF

[75] Inventors: Takahiro Fujimori; Makoto Sato, both of Tokyo; Tomoko Tanaka, Kanagawa, all of Japan

[73] Assignee: Sony Corporation, Tokyo, Japan

[21] Appl. No.: 08/968,357

[22] Filed: Nov. 12, 1997

[30] Foreign Application Priority Data

Nov. 12, 1996 [JP] Japan ................................ 8-315558

[51] Int. Cl.[7] .................................................. G06F 3/00
[52] U.S. Cl. ................ 710/9; 710/3; 710/4; 710/100; 370/451; 370/468; 370/362; 709/206; 709/236
[58] Field of Search .................................. 710/3, 4, 5, 9; 709/206, 236; 370/468, 391, 362; 340/825

[56] References Cited

U.S. PATENT DOCUMENTS

| | | | |
|---|---|---|---|
| 4,601,586 | 7/1986 | Bahr et al. | 709/206 |
| 4,777,595 | 10/1988 | Strecker et al. | 709/236 |
| 4,930,121 | 5/1990 | Shiobara | 370/85.4 |
| 4,964,038 | 10/1990 | Louis et al. | 710/9 |
| 5,243,596 | 9/1993 | Port | 370/231 |
| 5,331,316 | 7/1994 | Mestdagh et al. | 340/825.03 |
| 5,535,208 | 7/1996 | Kawakami et al. | 370/391 |
| 5,600,310 | 2/1997 | Whipple, III et al. | 340/825.06 |
| 5,760,698 | 6/1998 | Iijima et al. | 340/825.17 |
| 5,790,743 | 8/1998 | Sugiyama et al. | 386/52 |
| 5,799,150 | 8/1998 | Hamilton et al. | 709/203 |

FOREIGN PATENT DOCUMENTS

| | | |
|---|---|---|
| 0 315 158 | 5/1989 | European Pat. Off. . |
| 0 689 296 | 12/1995 | European Pat. Off. . |
| WO 84/03192 | 8/1984 | WIPO . |

OTHER PUBLICATIONS

Kunzman, A.; Wetzel, A.; 1394 High Performance Serial Bus: The Digital Interface for ATV, IEEE Transactions on Consumer Electronics, vol. 41, No. 3, Aug. 1995.

"IEEE Standard for a High Performance Serial Bus", Draft 7.1v1, IEEE P1394, published by the Institute of Electrical and Electronic Engineers on Aug. 5, 1994.

*Primary Examiner*—Thomas C. Lee
*Assistant Examiner*—Tammara Peyton
*Attorney, Agent, or Firm*—Frommer Lawrence & Haug, LLP.; William S. Frommer

[57] ABSTRACT

In a system for carrying out communication between a plurality of apparatus connected using an IEEE 1394 serial bus etc., command register addresses are fixed from "FFFF F000 0B00h" to "FFFF F000 0D00h" and response register addresses are fixed from "FFFF F000 0D00h" to "FFFF F000 0DF0h". These addresses are then common to all of the apparatus connected to the bus. Then, while an arbitrary apparatus on the bus is sending a command to all of the remaining apparatus, the address of the command register is included in the command and this command is transmitted as a broadcast communication. This command is then stored at a command register having a common address within the apparatus that received the command. Thus, time setting and state setting etc. of each apparatus can be achieved.

14 Claims, 10 Drawing Sheets

FIG.1

CSP: CYCLE START PACKET
ISP: Iso PACKET
ASP: Async PACKET

FIG.7A COMMAND FORMAT

| CTS | CT/RC | HA | OPC | OPR1 | OPR2 | OPR3 | OPR4 |
|---|---|---|---|---|---|---|---|
| 0h | REQUEST TYPE | COMMAND DESTINATION | COMMAND | PARAMETER 1 | PARAMETER 2 | PARAMETER 3 | PARAMETER 4 |

FIG.7B TIME SETTING COMMAND FORMAT

| CTS | CT/RC | HA | OPC | OPR1 | OPR2 | OPR3 | OPR4 |
|---|---|---|---|---|---|---|---|
| 0h | CONTROL | TIMER SUB-UNIT | TIME SETTING | AM/PM | HOURS | MINUTES | SECONDS |

FIG.7C POWER ON COMMAND FORMAT

| CTS | CT/RC | HA | OPC | OPR1 |
|---|---|---|---|---|
| 0h | CONTROL | UNIT | POWER | ON |

FIG.7D POWER OFF COMMAND FORMAT

| CTS | CT/RC | HA | OPC | OPR1 |
|---|---|---|---|---|
| 0h | CONTROL | UNIT | POWER | OFF |

FIG.7E PLAYBACK COMMAND FORMAT

| CTS | CT/RC | HA | OPC | OPR1 |
|---|---|---|---|---|
| 0h | CONTROL | VTR SUB-UNIT | PLAYBACK | FORWARD |

FIG.7F RECORDING COMMAND FORMAT

| CTS | CT/RC | HA | OPC | OPR1 |
|---|---|---|---|---|
| 0h | CONTROL | VTR SUB-UNIT | RECORDING | NORMAL |

| CTS | CT/RC | HA | OPC | OPR1 |
|---|---|---|---|---|
| "0"h | CONTROL | UNIT | POWER | OFF |

FIG.10B ②

| CTS | CT/RC | HA | OPC | OPR1 |
|---|---|---|---|---|
| "0"h | STATUS | VTR UNIT | POWER | FF |

FIG.10C ③

| CTS | CT/RC | HA | OPC | OPR1 |
|---|---|---|---|---|
| "0"h | STABLE | VTR UNIT | POWER | OFF |

FIG.10D ④

| CTS | CT/RC | HA | OPC | OPR1 |
|---|---|---|---|---|
| "0"h | STATUS | TUNER UNIT | POWER | FF |

FIG.10E ⑤

| CTS | CT/RC | HA | OPC | OPR1 |
|---|---|---|---|---|
| "0"h | STABLE | TUNER UNIT | POWER | OFF |

FIG.10F ⑥

| CTS | CT/RC | HA | OPC | OPR1 |
|---|---|---|---|---|
| "0"h | STATUS | LD PLAYER UNIT | POWER | FF |

FIG.10G ⑦

| CTS | CT/RC | HA | OPC | OPR1 |
|---|---|---|---|---|
| "0"h | STABLE | LD PLAYER UNIT | POWER | OFF |

FIG.12A

| CTS | CT/RC | HA | OPC | OPR1~8 | OPR9 | OPR10 |
|---|---|---|---|---|---|---|
| 0h | STATUS | UNIT | PHYSICAL ADDRESS INTERROGATION | NODE UNIQUE ID YYY-7 | PHYSICAL ADDRESS FF | FF |

STATUS COMMAND FORMAT OF PHYSICAL ADDRESS INTERROGATION

FIG.12B

| CTS | CT/RC | HA | OPC | OPR1~8 | OPR9 | OPR10 |
|---|---|---|---|---|---|---|
| 0h | STABLE | UNIT | PHYSICAL ADDRESS INTERROGATION | NODE UNIQUE ID YYY-7 | PHYSICAL ADDRESS #4 | |

STABLE RESPONSE FORMAT OF PHYSICAL ADDRESS INTERROGATION

FIG.12C

| OPR1 | OPR2 | OPR3 | OPR4 | OPR5 | OPR6 | OPR7 | OPR8 |
|---|---|---|---|---|---|---|---|
| COMPANY ID | | | SERIAL NUMBER | | | | |

CONFIGURATION OF NODE UNIQUE IDS FOR OPR1 TO 8

FIG. 13A

| CTS | CT/RT | HA | OPC | OPR1 | OPR2~3 | OPR4 | OPR5~6 |
|---|---|---|---|---|---|---|---|
| | STATUS | UNIT | OUTPUT NODE INTERROGATION | OUTPUT CHANNEL CH 3 | PHYSICAL ADDRESS FF FF | PLUG# FF | BAND FF FF |
| 0h | | | | | | | |

STATUS COMMAND FORMAT OF OUTPUT NODE INTERROGATION

FIG. 13B

| CTS | CT/RT | HA | OPC | OPR1 | OPR2~3 | OPR4 | OPR5~6 |
|---|---|---|---|---|---|---|---|
| | STABLE | UNIT | OUTPUT NODE INTERROGATION | OUTPUT CHANNEL CH 3 | PHYSICAL ADDRESS #3 | PLUG# #1 | BAND 24 80 |
| 0h | | | | | | | |

STABLE RESPONSE FORMAT OF OUTPUT NODE INTERROGATION

COMMUNICATION METHOD AND ELECTRONIC APPARATUS THEREOF

BACKGROUND OF THE INVENTION

The present invention relates to a system for carrying out communication between a plurality of electronic apparatus with the electronic apparatus being connected using an IEEE 1394 serial bus etc., and more particularly relates to technology for reducing the number of communication of control signals used in communicating while a certain electronic apparatus controls a plurality of other electronic apparatus.

A system has been considered where a plurality of electronic apparatus (hereinafter referred to as "apparatus") are connected together by a bus such as an IEEE 1394 serial bus (hereinafter referred to as a "1394 bus") which is capable of transmitting information signal packets and control signal packets with these packets mixed together and communication is then carried out between these apparatus.

Figure 1:
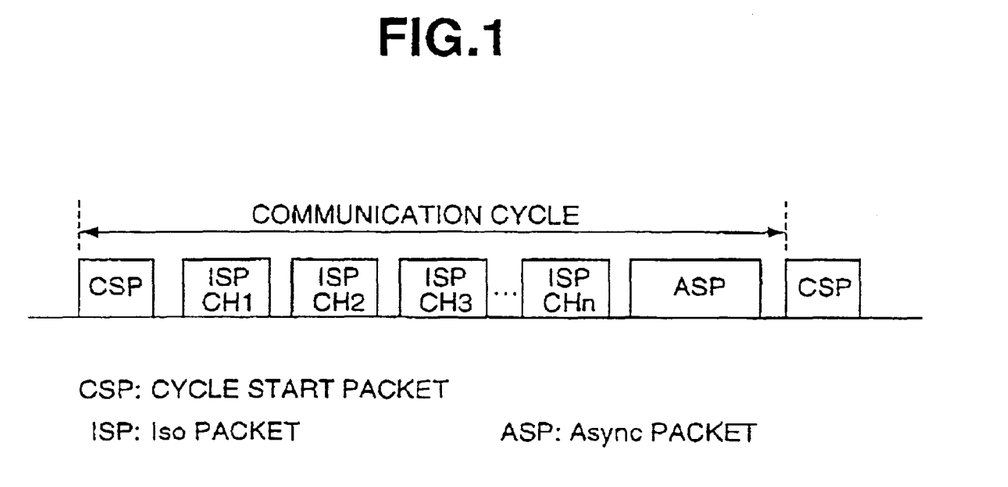
FIG. 1 is a view showing an example of signal transmission at apparatus connected to a 1394 bus.

In this system, time division multiplexing is performed on transmitted signals each prescribed communication cycle (for example, 125 msecs) as shown in FIG. 1. This signal transmission commences when an apparatus referred to as a "cycle master" transmits a cycle start packet indicating the start of a communications cycle onto the 1394 bus. The two types of communication occurring during one communication cycle are isochronous (hereinafter referred to as "Iso") communication where information signals such as digital video signals and digital audio signals etc. are transmitted in real time and asynchronous (hereinafter referred to as "Async") communication for transmitting control signals such as operation control commands for apparatus or control commands for connection between apparatus in irregular periods as necessary. Here, Iso packets are transmitted before Async packets. A plurality of Iso data can then be discriminated between by giving channel numbers 1, 2, 3, . . . n to the Iso packets. After the transmission of all of the Iso packets to be transmitted is complete, the period until the next cycle start packet is used for transmitting Async packets.

In Async communications, a control signal by which a certain apparatus requests something of another apparatus is referred to as a "command" and the side transmitting this command is referred to as a controller, with the side receiving the command being referred to as the target. The target then responds by sending a control signal (referred to as a "response") indicating command execution results to the controller as necessary. A series of exchanges starting with a command transmission and ending with a response are referred to as a command transaction. The controller is then capable of requesting specific operations of the target and interrogating the current conditions of the target with command transactions. Any apparatus within the system is capable of starting and ending command transactions with any apparatus being capable of becoming a controller or a target.

Figure 2:
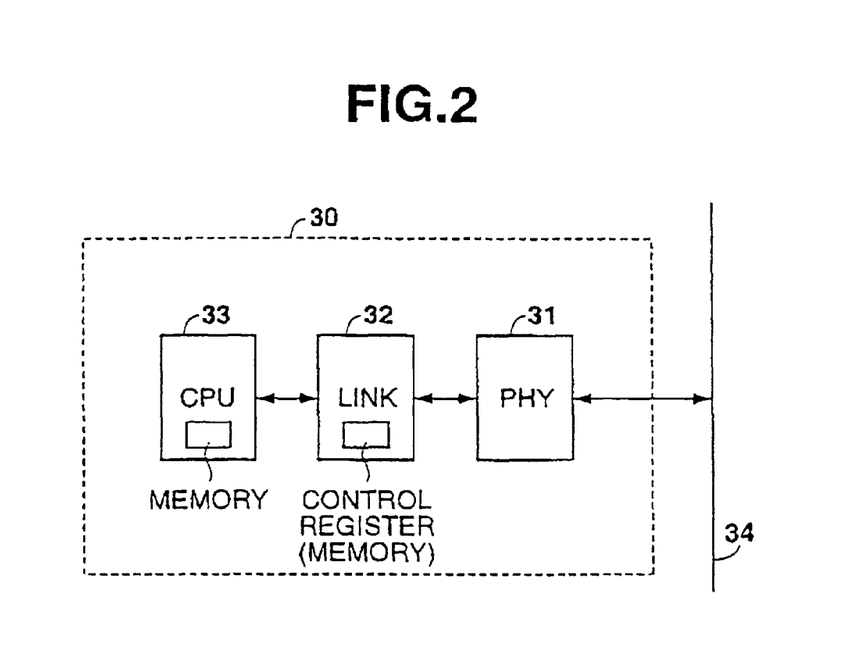
FIG. 2 is a block diagram showing the configuration of portions for carrying out transmission and reception of control signals within apparatus connected to the 1394 bus.

FIG. 2 is a block view showing the configuration of a portion for carrying out transmission and reception of control signals within each apparatus. A physical layer control block (PHY) 31, a link layer control block (LINK) 32 and a CPU 33 are provided within an apparatus 30. The physical layer control block carries out arbitration etc. for the initialization of the bus and the priority of use of the bus, as well as carrying out communication with the link layer control block 32 for the various control signals and transmission and reception of these signals to and from the cable of the 1394 serial bus 34. The link layer control block 32 carries out packet making/detection and error correction processing. The CPU 33 controls the physical layer control block 31 and the link layer control block 32 and carries out processing for the application layers for making the commands and responses etc. When commands and responses are being made, the CPU 33 writes data to prescribed addresses of a register provided within the link layer control block 32. Further, commands and responses transmitted by other apparatus are read by the CPU 33 after being written to a prescribed address of the register.

With the above system it was necessary for the clocks within the apparatus to be set to the same time for each apparatus regardless of whether or not the apparatus was connected to the 1394 bus and there has been no means for accurately setting the clock of each apparatus connected to the same 1394 bus to the same time.

Further, in the above described system, in order for a certain apparatus to set all of the other apparatus at standby condition, it is necessary to transmit command one by one from a certain apparatus to other apparatus.

As the present invention sets out to resolve the above problems, it is an object of the present invention to achieve time setting or state settings at each apparatus with just one communication.

SUMMARY OF THE INVENTION

In order to achieve the aforementioned object, in a method of transmitting a command to a plurality of electronic apparatus connected by a bus, the command is transmitted to all electronic apparatus connected to the bus using a broadcast communication with a command storage address common to the electronic apparatus being transmitted as an address for storing the command.

Further, in order to achieve the aforementioned object, in a method of receiving a command transmitted from an electronic apparatus as a controller via a bus, the command is transmitted to all electronic apparatus connected to the bus using a broadcast communication with a command storage address common to all of the electronic apparatus being transmitted in such a manner that the command is stored at the command storage address.

In the above methods, the command storage address can be stored within a packet header.

Further, the command can be stored in a data field within an Institute of Electrical and Electronic Engineers 1394 format isochronous packet.

A command for time setting can be used for the command to carry out time setting. Alternatively, a command for power supply control can be used as the command to carry out power supply control.

A prescribed address not used in normal communications can also transmitted or received as the command and a response can be carried out from an electronic apparatus with an address corresponding to the prescribed address.

Here, the bus can be an Institute of Electrical and Electronic Engineers 1394 serial bus, and the prescribed address can be a node unique identification.

Information relating to a resource of the bus can also be transmitted or received as the command, and a response is carried out from a corresponding an electronic apparatus taking possession of the resource.

Still further, in order to achieve the aforementioned object, an electronic apparatus utilized in a system carrying out communications between a plurality of electronic apparatus connected by a bus, comprises command storage part having an address common to all electronic apparatus connected by the bus. Here, the command storage part stores a received command.

This electronic apparatus further comprises a timer management part for carrying out time setting based on a command for time setting transmitted as the command.

This electronic apparatus can also further comprise a control part for carrying out power supply control based on a command for power supply control transmitted as the command.

This electronic apparatus can be a recording device having a control part carrying out recording mode control based on a command for recording mode transmitted as the command.

Moreover, this electronic apparatus can further comprise a storage part for storing a node unique identification, and carry out a response when the node unique identification is coincident with a node unique identification transmitted as the command.

Still further, the electronic apparatus can further comprise a storage part for storing information relating to a resource of the bus transmitted as the command, and carry out a response when the information is coincident with information relating to a resource transmitted as the command.

DETAILED DESCRIPTION OF THE PREFERRED EMBODIMENT Embodiment

The following is a detailed description with reference to the drawings of an embodiment of the present invention.

Figure 3:
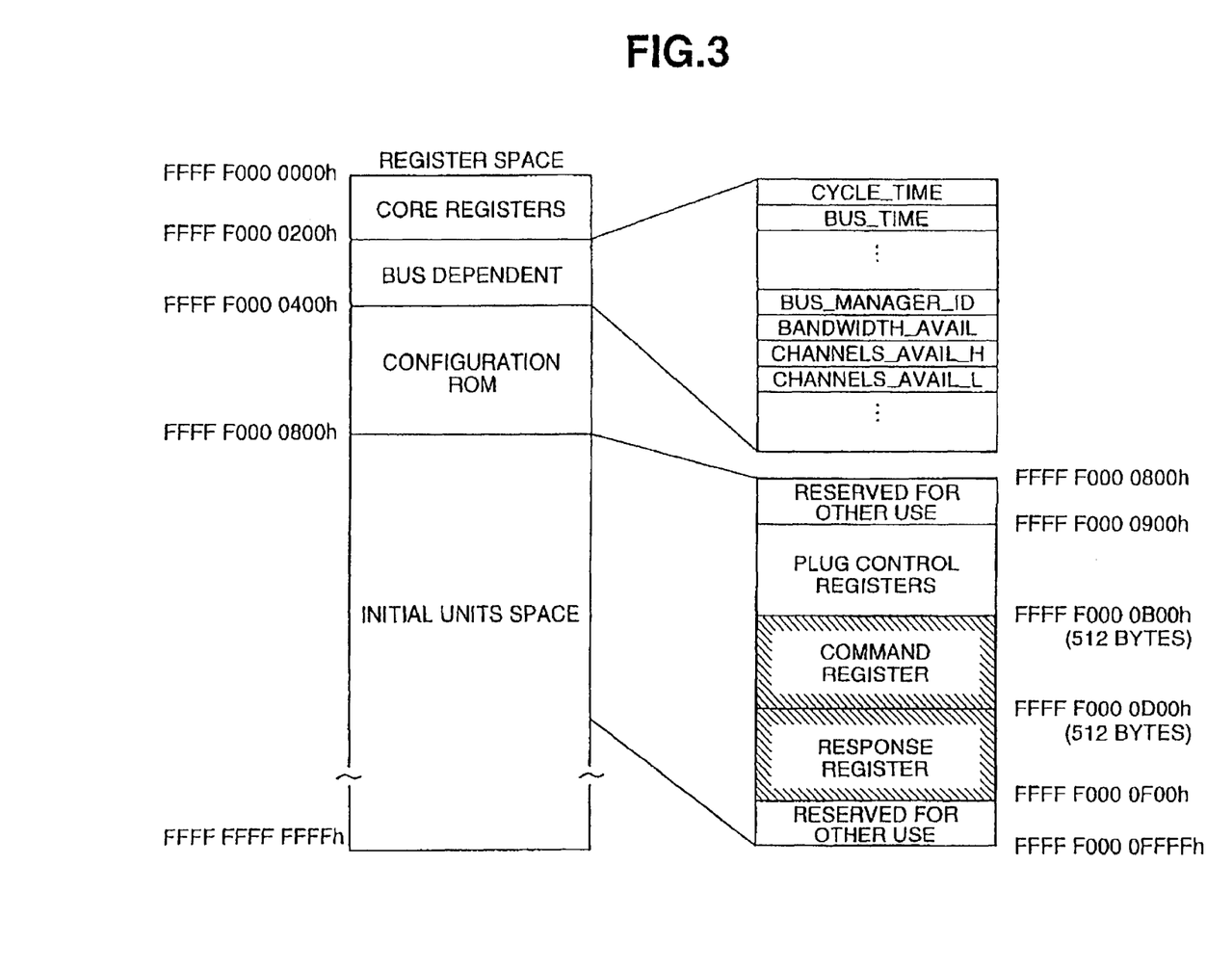
FIG. 3 is a view showing contents of a memory provided within a link layer control block within apparatus to which the present invention is applied.

FIG. 3 shows the contents of memory (register) provided within the link layer control block 32 or a CPU (Central Processing Unit) 33 within an apparatus to which the present invention is applied. Here, the address of an area (hereinafter referred to as a "command register") storing received commands is fixed at 512 bytes from "FFFFF000 0B00h" to "FFF F000 0D00h". Further, an address of an area (hereinafter referred to as a "response register") storing received responses is fixed at 512 bytes from "FFFF F000 0D00h" to "FFFF F000 0F00h". These addresses are shared by all of the apparatus connected using the 1394 bus. Other regions, for example, bus dependent regions, are regions characteristic to the IEEE 1394 standard. However, the regions are those decided by this standard and a description of these other regions is therefore omitted.

Figure 4:
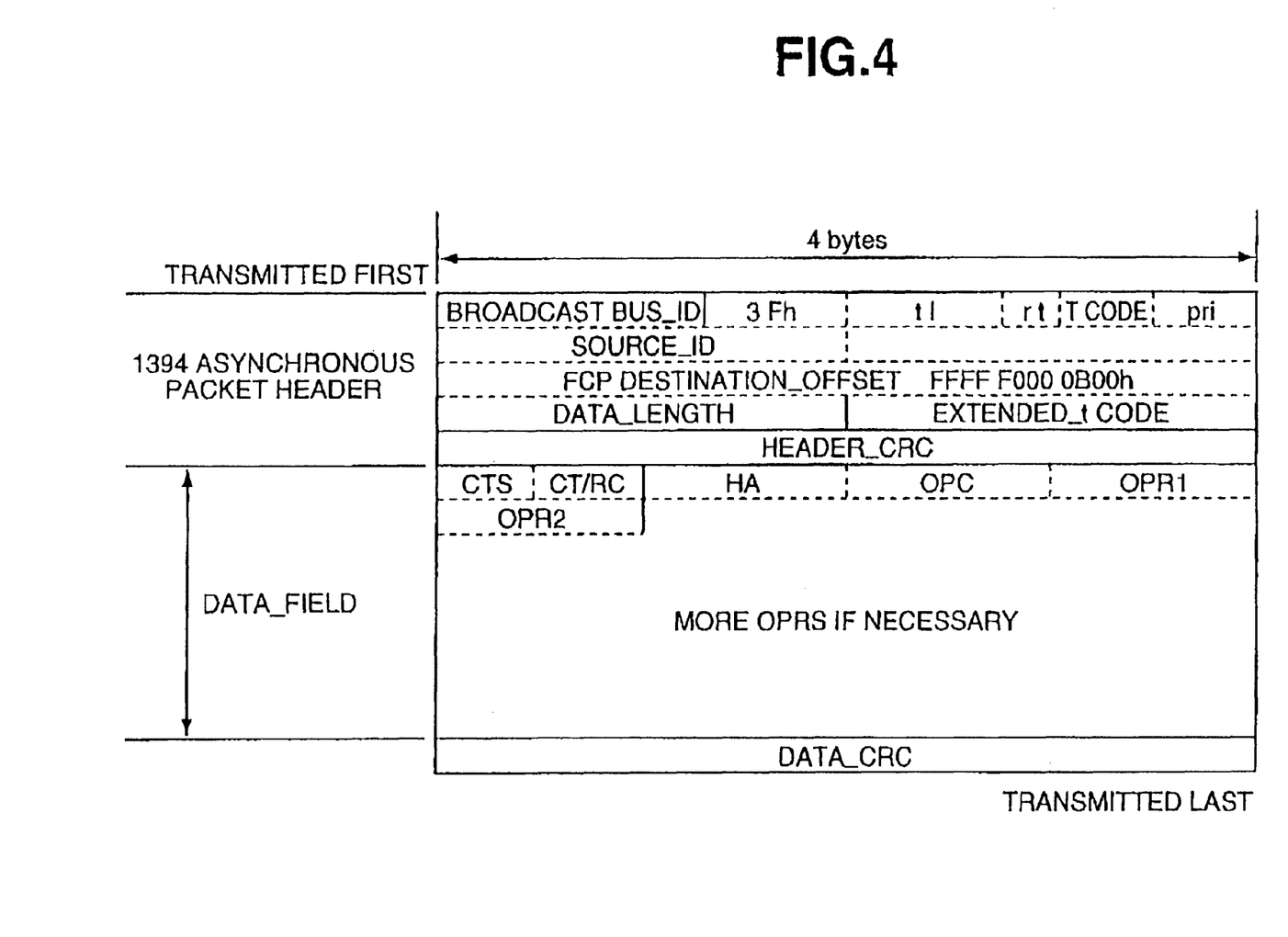
FIG. 4 is a view showing an example of an Async packet format used in the present invention.

FIG. 4 shows an example of a format for Async packets used in the present invention. This packet is a broadcast packet unilaterally transmitted to all of the apparatus capable of receiving this broadcast packet connected by the 1394 bus. Namely, it is shown that "3Fh" of the 1394 Async packet header is a packet destined for all apparatus. Further, by making an FCP (Function Control Protocol) destination offset value for the 1394 Async packet header the beginning address of the command register shown in FIG. 3, this packet is shown to be a command.

In FIG. 4, a command set type is shown at the CTS (Command Transaction Set) present at the head of the data field. Here, CT/RC (Command Type/Response Code) shows a request type for a command and shows a response type for a response. Further, HA (Header Address) shows the address in the case of a command and shows the sending source in the case of a response. A command and parameters thereof are then shown with an OPC (Operation Code) and an OPR (Operand).

Figure 5:
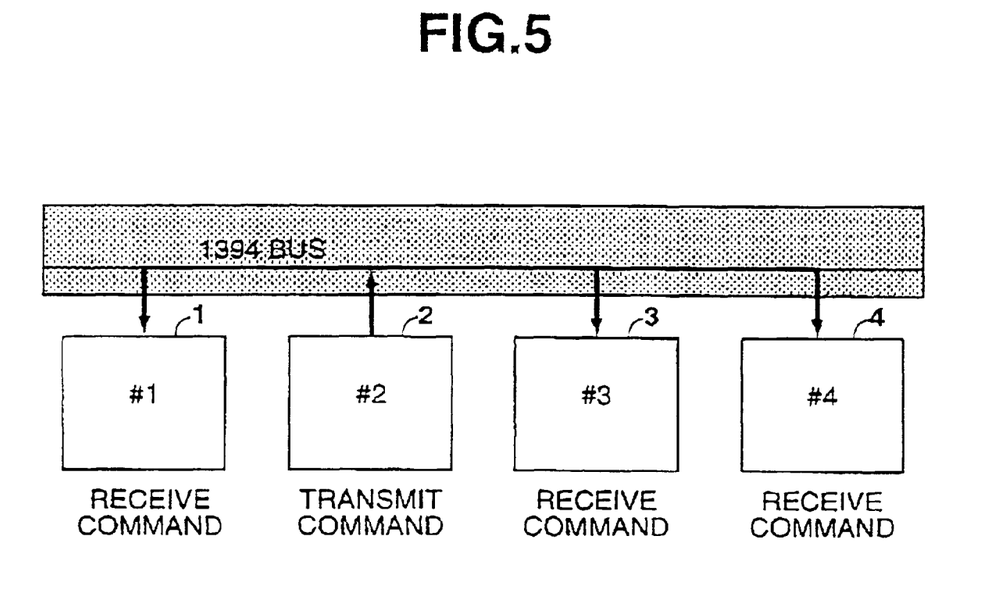
FIG. 5 is a view showing a method of controlling other apparatus using the broadcast command of FIG. 4.

FIG. 5 shows a method of controlling other apparatus using the broadcast command of FIG. 4. Here, four apparatus 1, 2, 3 and 4 are connected by the 1394 bus. The physical addresses of the apparatus 1, 2, 3 and 4 on the 1394 bus are #1, #2, #3 and #4. In the figure, apparatus 2 sends a command packet with the format shown in FIG. 2. At this time, the source ID of the 1394 Async packet header is #2. Other apparatus connected to the 1394 bus, i.e. the apparatus 1, 3 and 4 know that this packet is a broadcast packet by recognizing "3Fh" of the 1394 Async packet header. When the FCP destination offset value is recognized and it is known that the data for this packet is a command, this command is written to the command register. The command written to the command register is then read out by the CPU within the apparatus and processing is executed in response to this command.

Figure 6:
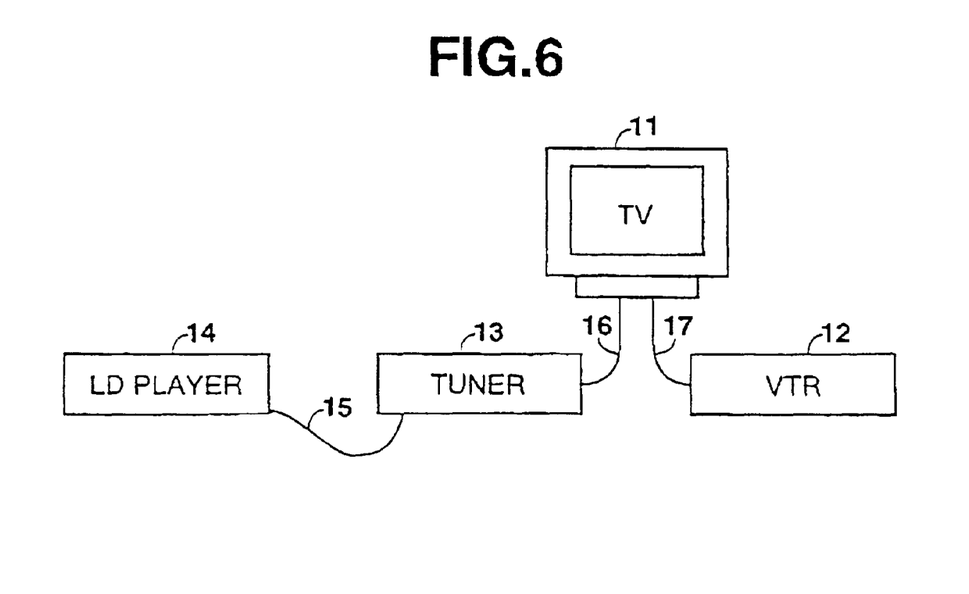
FIG. 6 is a view showing an example of an Audio Visual (hereinafter abbreviated to "AV") communication system to which the present invention is applied.

FIG. 6 shows an example of an AV communication system to which the present invention is applied. This system comprises a television receiver (hereinafter referred to as "TV") 11, a Video Tape Recorder (hereinafter referred to as "VTR") 12, a tuner 13 and a Laser Disc Player (hereinafter referred to as an "LD player") 14 connected together by 1394 bus cables 15 to 17. Each apparatus in this system is equipped with control signal processing blocks such as shown in FIG. 2, with the memory shown in FIG. 3 being provided at a control register within the link layer control block.

Figures 7A, 7B:
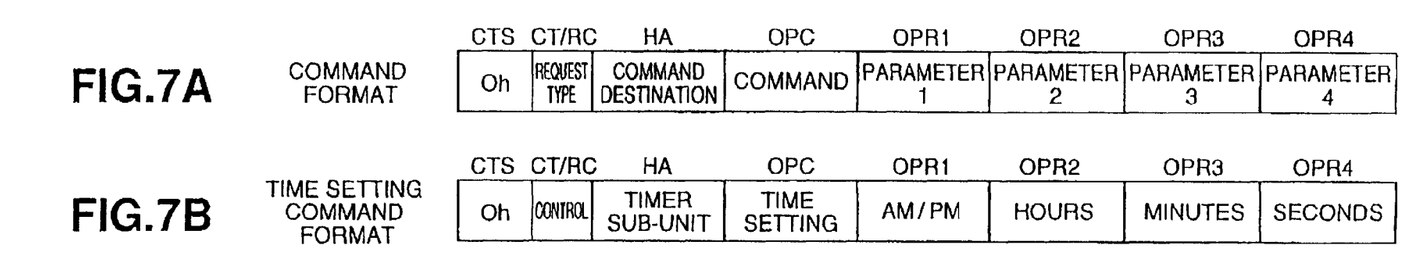
FIG. 7 is a view showing an example of commands used in the system shown in FIG. 6.

FIGS. 7A to 7F show an example of a command used in the system shown in FIG. 6. Here, FIG. 7A is a command format, with "0h" of the CTS indicating the presence of an AV/C (audio/video controller) command set conforming to 1394 bus protocol.

FIG. 7B shows a time adjusted command. When this command is sent to the 1394 bus by any of the TV 11, VTR 12, tuner 13 or LD player 14 using the broadcast packet shown in FIG. 4, this command is taken in by all of the apparatus on the 1394 bus and time setting is carried out at each apparatus, so that the time at all the apparatus coincides. For example, when the tuner 13 is equipped with a function for carrying out time setting itself using a time signal from a television broadcast, a time setting command can be transmitted with a broadcast packet directly after the tuner 13 has carried out time setting by itself using this function. Further, by adding a personal computer to the system of FIG. 6, this personal computer can be configured so as to periodically transmit a time setting command using broadcast packets. A configuration can also be adopted where time setting is carried out when new apparatus are added to the 1394 bus.

Figures 7C, 7D:
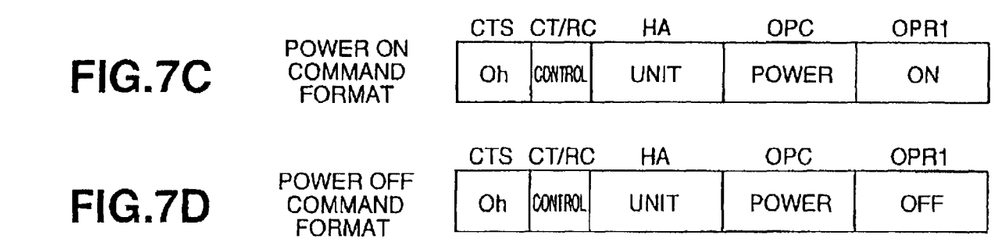

FIG. 7C shows a power on command. This command causes the power supply mode of an apparatus receiving this command to go from a standby state to an on state. The standby state is a state corresponding to the receiving of commands. When any of the TV 11, VTR 12, tuner 13 or LD player 14 send this command to the 1394 bus using the kind of broadcast packet shown in FIG. 4, this command is taken in by all of the apparatus on the 1394 bus and the power supply mode of all apparatus is automatically put to on simultaneously. The power off command shown in FIG. 7D, contrary to the power on command, causes the power supply mode of apparatus receiving this command to transfer from an on state to a standby state.

Figure 7E:
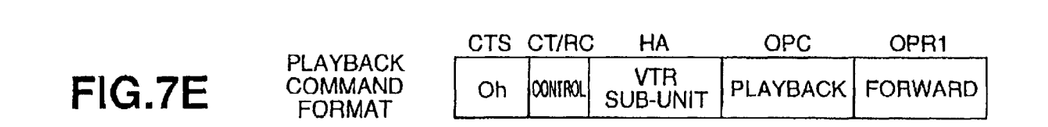
Figure 7F:
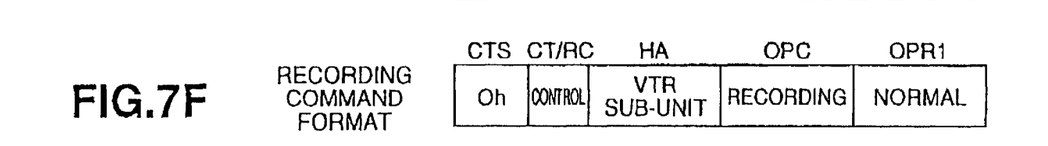

FIG. 7E shows a playback command. This command is a command setting the VTR in a forward direction playback mode. When this command is sent using a broadcast packet in a system where a plurality of VTRs are connected on a 1394 bus, a plurality of the VTRs are simultaneously set in playback mode. Further, FIG. 7F shows an example of a command for setting the recording speed of the VTR, particularly, for setting the VTR in normal recording mode. When this command is sent using a broadcast packet in a system where a plurality of the VTRs are connected on a 1394 bus, a plurality of the VTRs are simultaneously set in normal recording mode.

Figure 8:
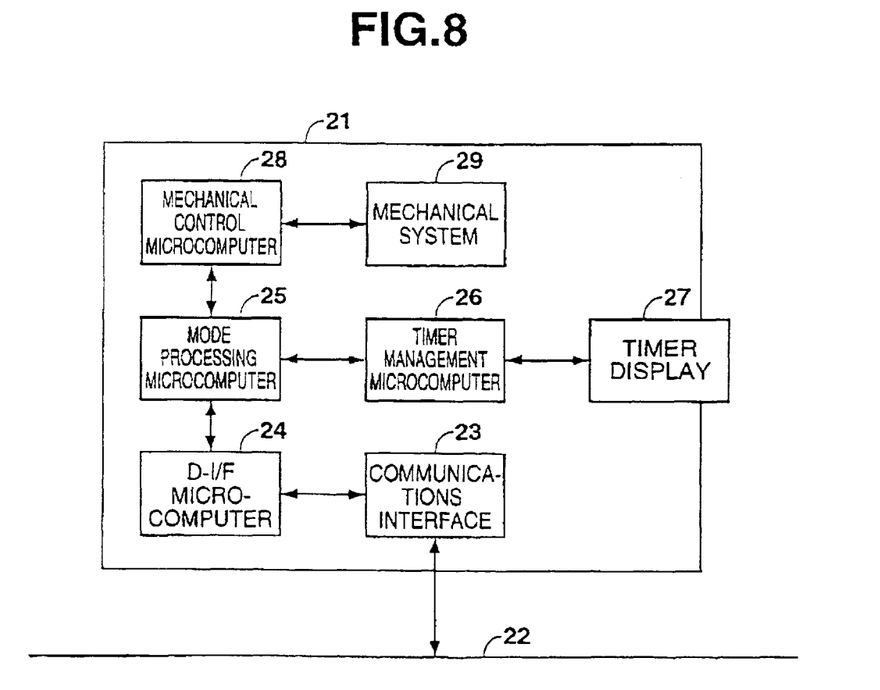
FIG. 8 is a block diagram showing the configuration of a VTR connected to a 1394 bus.

FIG. 8 is a block diagram showing a configuration of a VTR connected to the 1394 bus. The communications interface 23 shown in FIG. 8 corresponds to the physical layer control block 31 and the link layer control block 32 shown in FIG. 2. A digital interface microcomputer 24 corresponds to the CPU 33. A mode processing microcomputer 25 carries out control etc. of all of the operating modes of the VTR 21. A timer management microcomputer 26 then controls a timer display 27. A mechanical control microcomputer 28 controls a mechanical system 29 as well as power supplies. In an actual VTR a block is provided for processing audio and video signals, but as this bears no direct relationship to command communication, a description of this is omitted here. Although not shown in the drawings, other apparatus such as a television or tuner etc. connected to the 1394 bus are also provided with the basic configuration including the timer management microcomputer 26 and the mechanical control microcomputer 28 with the power supply control function etc.

Next, the operation when the VTR of FIG. 8 received the command shown in FIG. 7 is described. A packet on the 1394 bus 22 is inputted to the communications interface 23, with a command then being extracted and stored in the aforementioned command register within the link layer control block 32. The digital interface microcomputer 24 then reads out the command from the command register and sends this command to the mode processing microcomputer 25, which then executes processing in response to this command, i.e., in the case of a time setting command the timer management microcomputer 26 carries out processing so as to control the timer display 27. The mechanical control microcomputer 28 is put off in the case of a power off command and on in the case of a power on command. Further, in the case of a playback or record command, the mechanical control microcomputer 28 and an audio/video signal processing block not shown in the drawings are controlled so that playback or recording is carried out.

Figure 9:
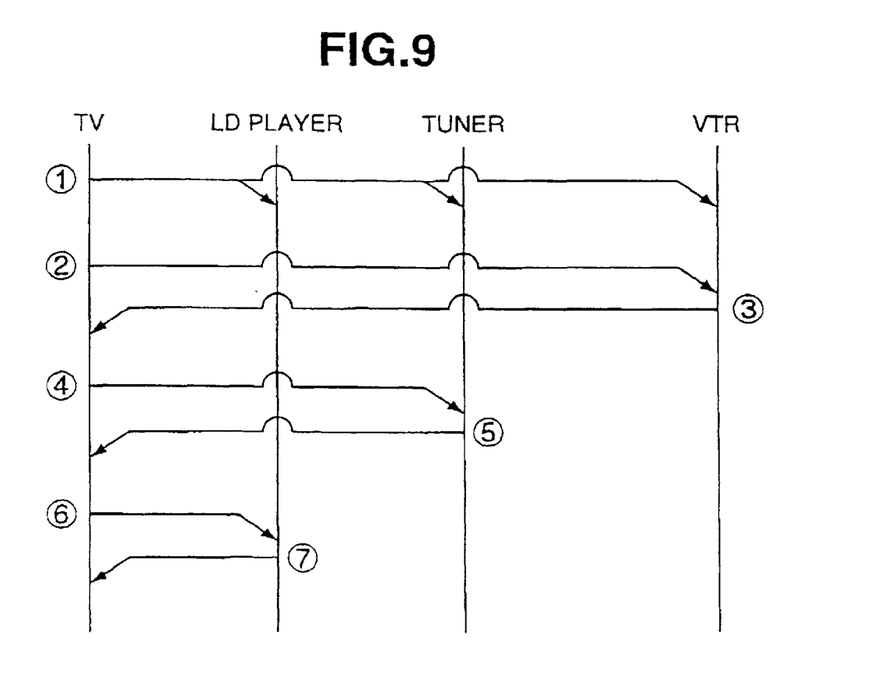
FIG. 9 is a view showing the procedure during confirmation of states of power supply after the TV has sent power off commands to all of the other apparatus in the system shown in FIG. 6.
Figure 10A:
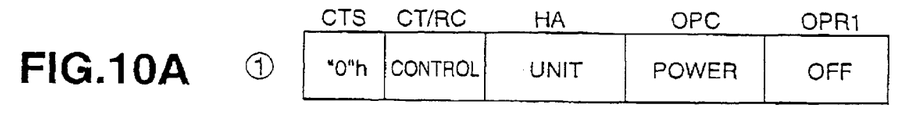
FIG. 10 is a view showing command and response formats used in the procedure of FIG. 9.
Figure 10B:
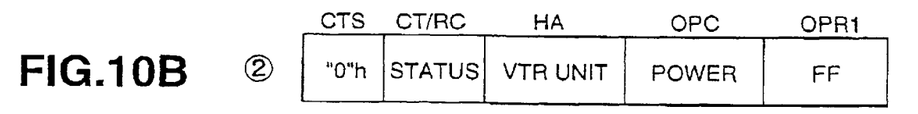
Figure 10C:
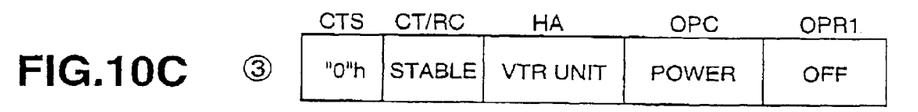
Figure 10D:
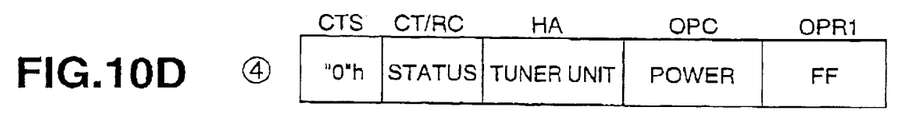
Figure 10E:
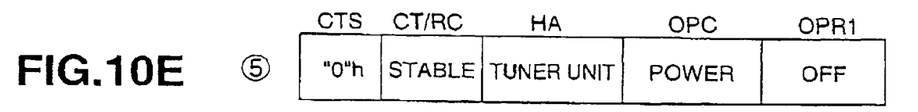
Figure 10F:
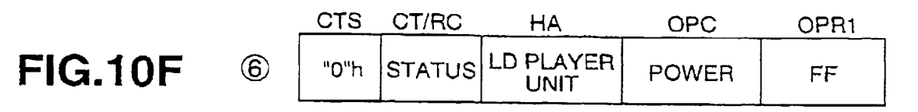
Figure 10G:
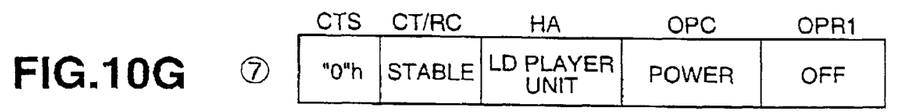

FIG. 9 shows the procedure while confirming power supply states in the system shown in FIG. 6 after the TV has sent a power off command to all of the other apparatus and FIG. 10 shows the command and response formats used in this procedure. Here, the encircled numbers 1 to 7 of FIG. 9 correspond to those 1 to 7 of FIG. 10, respectively. First, the TV 11 sends the power command shown in FIG. 10A using a broadcast packet in order to put the VTR 12, tuner 13 and LD player 14 in standby. Each apparatus then receives this command and decides whether or not to execute this command in accordance with its own specifications. The TV 11 then sends a status command shown in FIG. 10B to the VTR 12 in order to ascertain the state of its power supply. At this time, "3Fh" indicating a broadcast packet in the 1394 Async packet header is substituted by the physical address of the VTR 12 on the 1394 bus. In addition, a prescribed numerical value (FF) has been stored at the parameter region for securing the storing region for the response data (in this case, on or off). The VTR 12, on receiving this command, sends a stable response showing that the power supply is off as shown in FIG. 10C to the TV 11. By recognizing this response, the TV 11 can then confirm whether or not the VTR 12 is in standby. The TV 11 then carries out communications with the command and response shown in FIG. 10D to FIG. 10F between the tuner 13 and the LD player 14 so as to confirm whether or not these apparatus are in standby. Here, the case is shown where all apparatus have made the transition to standby. However, it is possible to carry out processing in accordance with the specifications of each apparatus such that, in the case of a VTR, a transition to standby will not be made upon the reception of a power off command during recording, or, in the case of a personal computer, a power off command cannot be accepted. Here, confirmation of the states of power supply has been performed in the order of VTR, tuner and then LD player but this may be carried out in arbitrary order.

FIG. 11 shows a method for investigating the physical address of other apparatus with known node unique IDs using the broadcast command of FIG. 4. Here, four apparatus 1, 2, 3 and 4 are connected using a 1394 bus, with the physical addresses on the 1394 bus of the apparatus 1, 2, 3 and 4 being #1, #2, #3 and #4, respectively. Further, the respective node unique IDs of the apparatus 1, 2, 3 and 4 are "YYY-1", "XXX-13", "XXX-15" and "YYY-7". A node unique ID is a unique ID given to apparatus used in being connected to the 1394 bus and comprises a company ID and serial number. Company IDs are allotted to vendors of apparatus by the IEEE and serial numbers are allotted to the apparatus by each vendor. These node unique IDs are written beforehand to ROMs within each apparatus and do not change even when the 1394 bus is reset. Contrary to this, however, a physical address may be changed when the 1394 bus is reset.

Figure 11A:
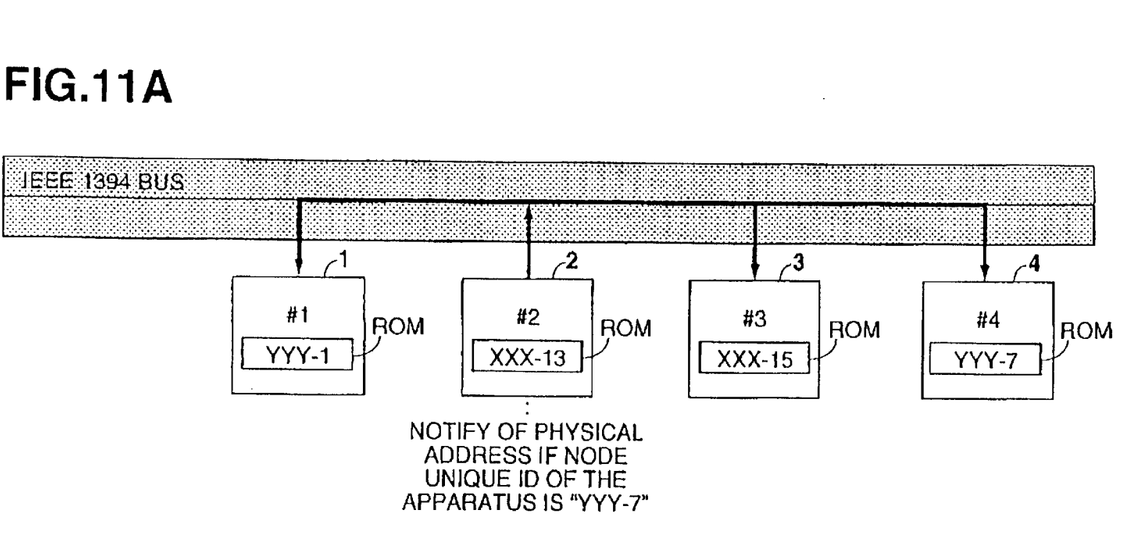
FIG. 11 is a view showing a method of investigating the physical addresses of other apparatus for with the known node unique ID using the broadcast command of FIG. 4.
Figure 11B:
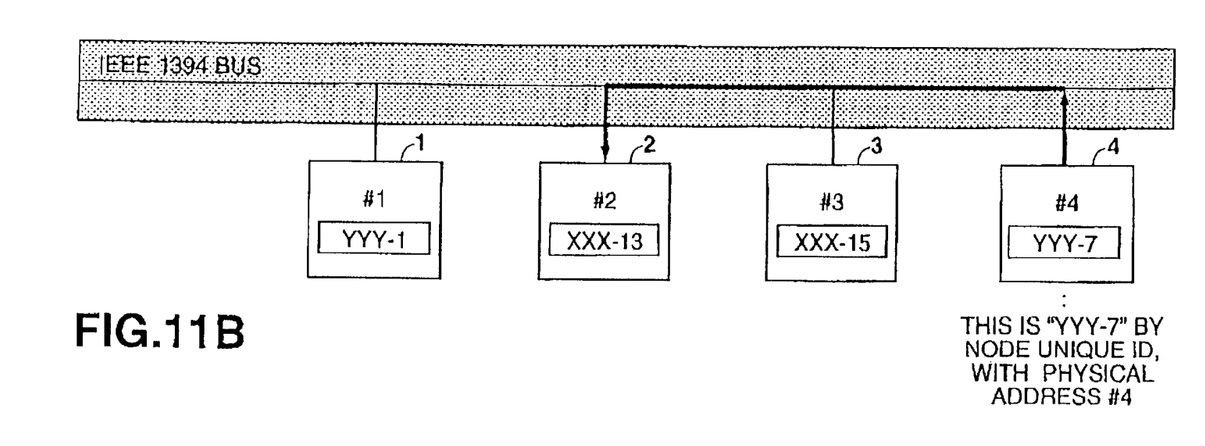
Figure 12A:
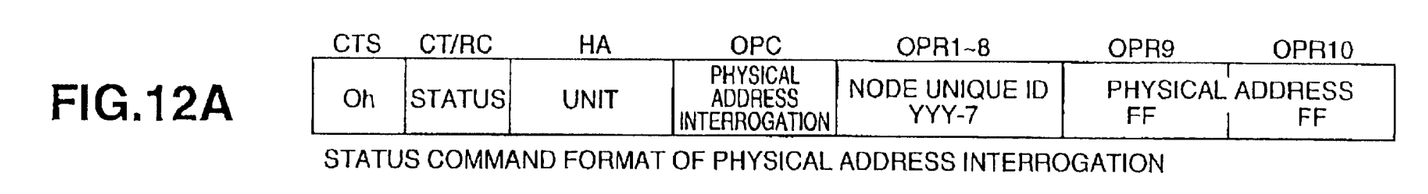
FIG. 12 is a view showing the command and response formats used in the method shown in FIG. 11.
Figure 12B:
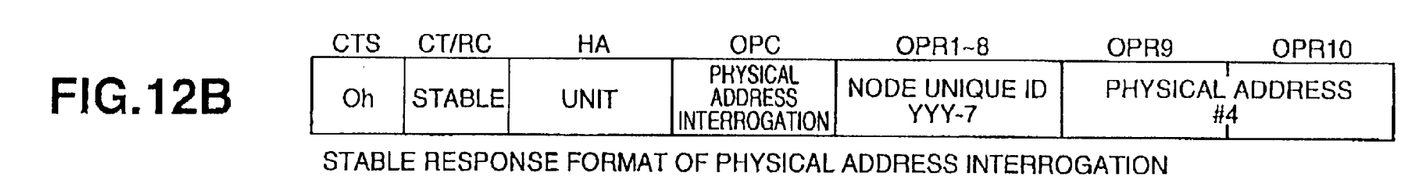
Figure 12C:
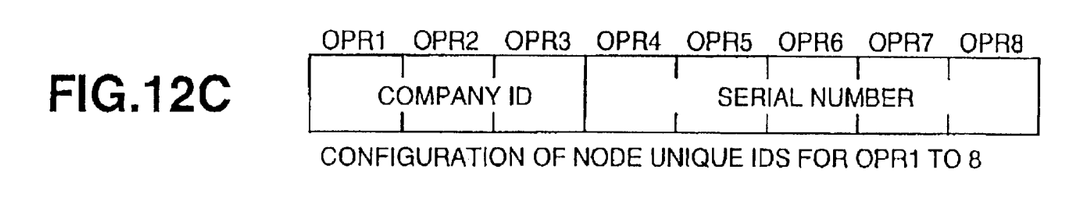

The command and response formats used in the way shown in FIGS. 11A and 11B are shown in FIGS. 12A to 12C. As shown in FIG. 11A, the apparatus 2 sends a command to require notification of the physical address of apparatus having a node unique ID of "YYY-7" to the apparatus 1, 3 and 4 connected using the 1394 serial bus. This is achieved by sending the command shown in FIG. 12A to the 1394 bus using the broadcast packet shown in FIG. 4. The node unique IDs in OPR 1 to 8 of FIG. 12A comprise a three byte company ID and a five byte serial number, as shown in FIG. 12C. The apparatus 1, 3 and 4 then receive this command and compare this command with a node unique ID stored within a ROM of each apparatus. As a result, apparatus having a node unique ID coincident with the received node unique ID, that is, the apparatus having a node unique ID of "YYY-7" as shown in FIG. 11B, i.e. the apparatus 4, responds to the apparatus 2 in such a manner as to give notice that its own physical address is #4. The response format used at this time is shown in FIG. 12B.

Figure 13A:
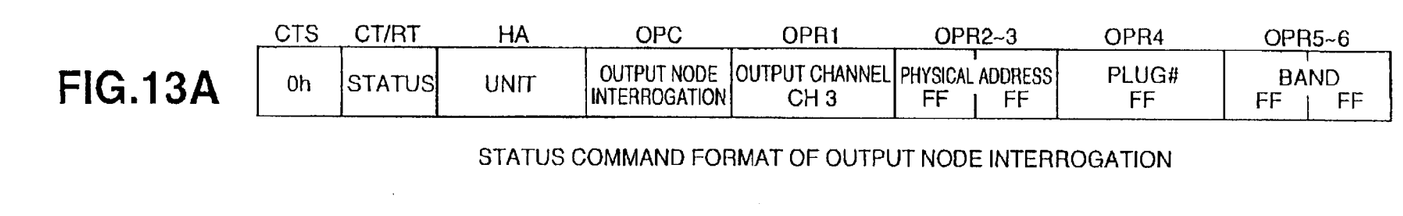
FIG. 13 is a view showing command and response formats used while searching for apparatus for with the known channel number is known that are outputting Iso packets.
Figure 13B:
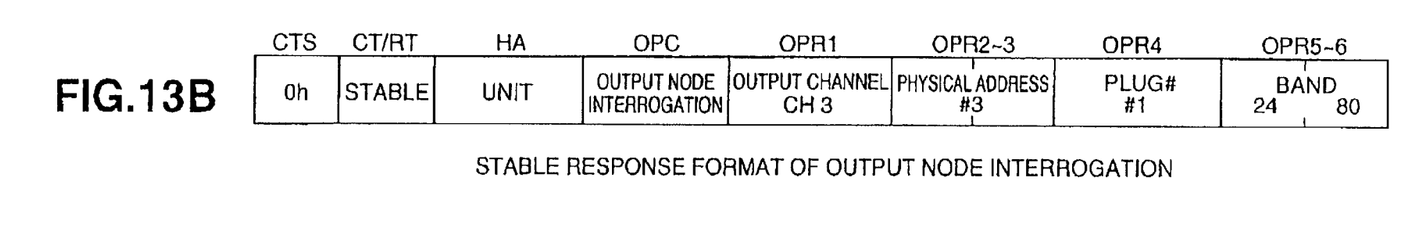

As described above, when a bus reset occurs for a reason such as new apparatus being added to the 1394 bus, physical addresses are re-allotted to cause possible change in the physical addresses of each apparatus. Because of this, when an apparatus with the known physical address outputs an Iso packet to the 1394 bus before a bus reset, this apparatus becomes unknown after the bus reset. At this time, as a method of finding this apparatus, information relating to the resources of the bus is utilized. In this method, a command is transmitted from an apparatus designated as a controller to each apparatus connected to the 1394 bus with the number of the channel to which an Iso packet is outputted being designated and information relating to the apparatus outputting the Iso packet to the designated channel is interrogated with a broadcast. The apparatus outputting the Iso packet to the designated channel, on detecting the reception of the interrogation with the broadcast, then responds to the controller that is the transmission source with information relating to the resources of the apparatus itself, so that the controller can identify the apparatus. For example, a command shown in FIG. 13A is for making interrogations regarding the physical address (including the bus ID and the PHY_ID), the number of the logical plug outputting the packet and how much of the band width of the 1394 bus is being used, When the apparatus receiving this command is using channel number 3, the apparatus sends back a stable response with interrogated parameters as shown in FIG. 13B. Information relating to such resources (the aforementioned channel number, physical address, logical plug number and band width etc.) is stored in a predetermined storage and its coincidence with a command is detected by carrying out comparisons with the contents of the aforementioned command. In this way, by designating information relating to the resources, the apparatus acquiring the information can be identified.

In the above, a description was given of a system where a plurality of apparatus were connected using a 1394 bus. However, the present invention can also be used to investigate physical addresses for other buses by using broadcast commands and designating apparatus addresses that are not used in normal communications. A target apparatus can also be searched for by designating information relating to the bus resource.

As described above, according to the present invention, control of time setting and the setting states of power supply etc. can be realized with a one-time communication for a plurality of apparatus connected to a bus. Further, by designating addresses not used in normal communications such as node unique addresses of the 1394 bus and information relating to bus resources and adopting a configuration where only apparatus having these designated addresses or information relating to the bus resources respond, apparatus having these designated addresses and apparatus acquiring information relating to the designated bus resources can be investigated.

What is claimed is:

1. A method of delivering an information packet in a system carrying out communications between a plurality of electronic apparatuses connected by a bus, upon the occurrence of a bus reset when said information packet has been output to said bus and is to be delivered to a set physical address and said bus reset re-allocates the physical address of said electronic apparatuses connected to said bus, comprising the steps of:

transmitting a command from a designated controller apparatus to all other electronic apparatuses connected to said bus, said command including information regarding a channel of said bus on which said information packet on said bus resides;

each electronic apparatus connected to said bus determining whether it transmitted said information packet on said channel of said bus prior to said bus reset; and receiving said information packet at one or more intended connected electronic apparatuses based upon said determined transmitting electronic apparatus.

2. The method of claim 1, further comprising the step of notifying said controller by said determined transmitting electronic apparatus the new physical address of said determined transmitting electronic apparatus.

3. The method of claim 1, wherein said command is transmitted to all of said other connected electronic apparatus by a broadcast.

4. The method of claim 1, wherein said intended one or more electronic apparatuses are determined in accordance with said channel on which said command resides.

5. The method of claim 4, wherein said transmitting electronic apparatus and said intended one or more electronic apparatuses were connected by said channel of said bus prior to said bus reset.

6. The method of claim 1, wherein each connected electronic apparatus includes a node unique ID that does not change upon a bus reset.

7. The method of claim 6, wherein said node unique ID of said transmitting electronic apparatus that output said information packet and said intended one or more electronic apparatuses for receiving said information are connected to re-establish a channel therebetween and deliver said information packet.

8. In a system for carrying out communications between a plurality of electronic apparatus connected by a bus, upon the occurrence of a bus reset when an information packet has been output to said bus and is to be delivered to a set physical address and said bus reset re-allocates the physical address of said electronic apparatuses connected to said bus, apparatus for delivering the information packet comprising:

a designated controller apparatus for transmitting a command to all other electronic apparatuses connected to said bus, said command including information regarding a channel of said bus on which said information packet on said bus resides;

means associated with each electronic apparatus connected to said bus for determining whether it transmitted said information packet on said channel of said bus prior to said bus reset; and means associated with one or more intended connected electronic devices for receiving said information packet based upon said determined transmitting electronic apparatus.

9. The system of claim 8, further comprising means associated with said determined transmitting electronic apparatus for notifying said controller of the new physical address of said determined transmitting electronic apparatus.

10. The system of claim 8, wherein said command is transmitted to all of said other connected electronic apparatus by a broadcast.

11. The system of claim 8, wherein said intended one or more electronic apparatuses are determined in accordance with said channel on which said command resides.

12. The system of claim 11, wherein said transmitting electronic apparatus and said intended one or more electronic apparatuses were connected by said channel of said bus prior to said bus reset.

13. The system of claim 8, wherein each connected electronic apparatus includes a node unique ID that does not change upon a bus reset.

14. The system of claim 13, wherein said node unique ID of said electronic apparatus that output said information packet and said intended one or more electronic apparatuses for receiving said information are connected to re-establish a channel therebetween and deliver said information packet.

* * * * *